(12) United States Patent
Ma

(10) Patent No.: US 6,882,624 B1
(45) Date of Patent: Apr. 19, 2005

(54) CONGESTION AND OVERLOAD CONTROL IN A PACKET SWITCHED NETWORK

(75) Inventor: Jian Ma, Beijing (CN)

(73) Assignee: Nokia Networks Oy, Espoo (FI)

( * ) Notice: Subject to any disclaimer, the term of this patent is extended or adjusted under 35 U.S.C. 154(b) by 916 days.

(21) Appl. No.: 09/679,476

(22) Filed: Oct. 4, 2000

Related U.S. Application Data

(63) Continuation of application No. PCT/FI99/00302, filed on Apr. 9, 1999.

(30) Foreign Application Priority Data

Apr. 9, 1998 (FI) .................................................. 980825

(51) Int. Cl.[7] .............................................. G01R 31/08
(52) U.S. Cl. ............... 370/236.1; 370/282; 370/395.52; 709/233
(58) Field of Search ................................. 370/229, 230, 370/230.1, 235, 236, 236.1, 236.2, 241, 241.1, 242, 245, 282, 395.1, 395.51, 395.52; 709/230–233, 235

(56) References Cited

U.S. PATENT DOCUMENTS

| | | | | |
|---|---|---|---|---|
| 5,793,768 A | | 8/1998 | Keshav | |
| 5,974,028 A | * | 10/1999 | Ramakrishnan | 370/229 |
| 6,038,216 A | * | 3/2000 | Packer | 370/231 |
| 6,076,114 A | * | 6/2000 | Wesley | 709/235 |
| 6,105,064 A | * | 8/2000 | Davis et al. | 709/224 |
| 6,151,300 A | * | 11/2000 | Hunt et al. | 370/231 |
| 6,167,027 A | * | 12/2000 | Aubert et al. | 370/230 |
| 6,252,851 B1 | * | 6/2001 | Siu et al. | 370/236 |
| 6,359,882 B1 | * | 3/2002 | Robles et al. | 370/389 |

OTHER PUBLICATIONS

Hari Balakrishan, Venkata Padmanabhan, and Randy H. Katz; "The Effects of Asymmetry on TCP Performance", Proc. 3rd ACM/IEEE Conference on Mobile Computing and Networking (MobiCom), Budapest, Hungary, Sep. 1997.

* cited by examiner

*Primary Examiner*—John Pezzlo
*Assistant Examiner*—Dmitry Levitan
(74) *Attorney, Agent, or Firm*—Squire, Sanders & Dempsey, L.L.P.

(57) ABSTRACT

The invention relates to a method for controlling overload in a packet switched network, especially in a network where Transmission Control Protocol (TCP) is used as the transport layer protocol. In order to inform the traffic source at a very early stage that the network is getting overloaded or congested, duplicate acknowledgments are transmitted towards the traffic source when the measured load level exceeds a predetermined threshold.

19 Claims, 9 Drawing Sheets

CONGESTION AND OVERLOAD CONTROL IN A PACKET SWITCHED NETWORK

This application is a continuation of PCT/FI99/00302 filed Apr. 9, 1999.

FIELD OF THE INVENTION

This invention relates generally to flow control in a telecommunications network. More particularly, the invention relates to congestion control in a packet switched telecommunications network, especially in a network where Transmission Control Protocol (TCP) is used as a transport layer protocol.

BACKGROUND OF THE INVENTION

As is commonly known, TCP is the most popular transport layer protocol for data transfer. It provides a connection-oriented reliable transfer of data between two communicating hosts. (Host refers to a network-connected computer, or to any system that can be connected to a network for offering services to another host connected to the same network.) TCP uses several techniques to maximize the performance of the connection by monitoring different variables related to the connection. For example, TCP includes an internal algorithm for avoiding congestion.

ATM (Asynchronous Transfer Model) is a newer connection-oriented packet-switching technique which the international telecommunication standardization organization ITU-T has chosen as the target solution for a broadband integrated services digital network (BISON). The problems of conventional packet networks have been eliminated in the ATM network by using short packets of a standard length (53 bytes), known as cells. ATM networks are quickly being adopted as backbones for the various parts of TCP/IP networks (such as Internet).

Although ATM has been designed to provide an end-to-end transport level service, it is very likely that also the future networks will be implemented in such a way that (a) TCP/IP remains as the de-facto standard of the networks and (b) only part of the end-to-end path of a connection is implemented using ATM. Thus, even though ATM will continue to be utilized, TCP will still be needed to provide the end-to-end transport functions.

The introduction of ATM also means that implementations must be able to accomodate the huge legacy of existing data applications, in which TCP is widely used as transport layer protocol. To migrate the existing upper layer protocols to ATM networks, several approaches to congestion control in ATM networks have been considered in the past.

Congestion control relates to the general problem of traffic management for packet switched networks. Congestion means a situation in which the number of transmission requests at a specific time exceeds the transmission capacity at a certain network point (called a bottleneck resource). Congestion usually results in overload conditions. As a result, the buffers overflow, for instance, so that packets are retransmitted either by the network or by the subscriber. In general, congestion arises when the incoming traffic to a specific link is more than the outgoing link capacity. The primary function of congestion control is to ensure good throughput and delay performance while maintaining a fair allocation of network resources to users. For TCP traffic, whose traffic patterns are often highly bursty congestion control poses a challenging problem. It is known that packet losses result in significant degradation in TCP throughput. Thus, for the best possible throughput, a minimum number of packet losses should occur.

The present invention relates to congestion control in packet switched networks. For the above-mentioned reasons, most of such networks are, and will be in the foreseeable future, TCP networks or TCP over ATM networks (i.e. networks in which TCP provides the end-to-end transport functions and the ATM network provides the underlying "bit pipes"). In the following, the congestion control mechanisms of these networks are described briefly.

ATM Forum has specified five different service categories which relate traffic characteristics and the quality of service (QoS) requirements to network behavior. These service classes are: constant bit rate (CBR), real-time variable bit rate (rt-VBR), non-real time variable bit rate (nrt-VBR), available bit rate (ABR), and unspecified bit rate (UBR). These service classes divide the traffic between guaranteed traffic and so-called "best effort traffic", the latter being the traffic which utilizes the remaining bandwidth after the guaranteed traffic has been served.

One possible solution for the best effort traffic is to use ABR (Available Bit Rate) flow control. The basic idea behind ABR flow control is to use special cells, so-called RM (Resource Management) cells, to adjust source rates. ABR sources periodically probe the network state (factors such as bandwidth availability, the state of congestion, and impending congestion) by sending RM calls intermixed with data cells. The RM cells are turned around at the destination and sent back to the source. Along the way, ATM switches can write congestion information on these RM cells. Upon receiving returned RM cells, the source can then increase, decrease, or maintain its rate according to the information carried by the cells.

In TCP over ATM networks, the source and the destination are interconnected through an IP/ATM/IP sub-network. FIG. 1 illustrates a connection between a TCP source A and a TCP destination B in a network, where the connection path goes through an ATM network using ABR flow control. When congestion is detected in the ATM network, ABR rate control becomes effective and forces the edge router R1 to reduce its transmission rate to the ATM network. Thus, the purpose of the ABR control loop is to command the ATM sources of the network to reduce their transmission rate. If congestion persists, the buffer in the router will reach its maximum capacity. As a consequence, the router starts to discard packets, resulting in the reduction of the TCP congestion window (the congestion window concept will be explained in more detail later).

From the point of view of congestion control, the network of FIG. 1 comprises two independent control loops: an ABR control loop and a TCP control loop. However, this kind of congestion control, which relies on dual congestion control schemes on different protocol layers, may have an unexpected and undesirable influence on the performance of the network. To put it more accurately, the inner control loop (ABR loop) may cause unexpected delays in the outer control loop (TCP loop).

An alternative approach to support the best effort traffic is to use UBR service with sufficiently large buffers and let the higher layer protocols, such as TCP, handle overload or congestion situations. FIG. 2 illustrates this kind of network, i.e. a TCP over UBR network The nodes of this kind of network comprise packet discard mechanisms which discard packets or cells when congestion occurs. When a packet is discarded somewhere in tie network, the corresponding TCP source does not receive an acknowledgment. As a result, the TCP source reduces its transmission rate.

The UBR service employs no flow control and provides no numerical guarantees on the quality of service: it is therefore also the least expensive service to provide. However, because of Its simplicity, plain UBR without adequate buffer sizes provides poor performance in a congested network.

To eliminate this drawback, more sophisticated congestion control mechanisms have been proposed. One is the so-called early packet discard (EPD) scheme. According to the early packet discard scheme, an ATM switch drops entire packets prior to buffer overflow. In this way the throughput of TCP over ATM can be much improved, as the ATM switches need not transmit cells of a packet with corrupted cells, i.e. cells belonging to packets in which at least one cell is discarded (these packets would be discarded during the reassembly of packets in any case). Another advantage of the EPD scheme is that it is relatively inexpensive to implement in an ATM switch. For those interested in the subject, a detailed description of the EPD method can be found, for example, in an article by A. Romanow and S. Floyd, *Dynamics of TCP Traffic over ATM Networks*, Proc. ACM SIGCOMM '94, pp. 79–88, August 1994.

However, the EPD method still deals unfairly with the users. This is due to the fact that the EPD scheme discards complete packets from all connections, without taking into account their current rates or their relative shares in the buffer, i.e. without taking into account their relative contribution to an overload situation. To remedy this drawback, several variations for selective drop policies have been proposed. One of these is described in an article by Rohit Goyal, *Performance of TCP/IP over UBR+*, ATM_Forum/ 96-1269. This method uses a FIFO buffer at the switch and performs some per-VC accounting to keep track of the buffer occupancy of each virtual circuit in this way only cells from overloading connections can be dropped, whereas the underloading connections can increase their throughput.

Despite these improvements, the above prior art congestion control methods still have the major drawback that there is no means of giving early warning to the traffic source when excessive load is detected in the network. In other words, the traffic source is not informed quickly of overload so that it can reduce its output rate.

SUMMARY OF THE INVENTION

The purpose of the invention is to eliminate the above-mentioned drawback and to create a method by means of which it is possible, using a simple implementation, to inform the traffic source at a very early stage that the network is becoming overloaded or congested and to ask the source to slow down its transmission rate. The purpose is also that the method allows the co-operation of TCP and ATM flow control mechanisms in an efficient way.

This goal can be attained by using the solution defined in the independent patent claims.

The basic idea of the invention is to send duplicate acknowledgments to the traffic source if excessive load is detected in the network. This means that a network node sends the source M successive acknowledgments in which the acknowledgment number, which indicates the next sequence number that the destination expects to receive, is the same.

Duplicate acknowledgments can be generated at the same network point where congestion has been detected, or, alternatively, a network point detecting overload or congestion can direct another network point to generate duplicate acknowledgments. Thus, with this invention congestion control is performed on the backward path of the connection, whereas prior art systems control traffic on the forward path.

Instead of discarding packets or cells on the forward path, the network according to the present invention sends duplicate acknowledgments on the backward path and in this way causes the TCP source to reduce its output rate.

The invention offers an inexpensive solution for giving the TCP source an early warning of impending overload or congestion in the network. It is also important to note that the transport protocol TCP itself does not have to be altered in any way.

Moreover, by means of the present invention the variations in the output rate of the TCP source can be smoothed, which in turn results in better bandwidth utilization. Furthermore, because the amount of variation is lessened, the buffer capacity requirements are also reduced.

The method can be used alone or together with other congestion control methods. According to one embodiment of the invention, duplication is combined with the delaying of acknowledgments so that acknowledgments are duplicated only when the load level exceeds a first predetermined value on the forward path and a second predetermined value on the backward path.

By means of the invention the performance of connections can be significantly improved, especially in large latency networks.

BRIEF DESCRIPTION OF THE DRAWINGS

In the following, the invention and its preferred embodiments are described in closer detail with reference to examples shown in the appended drawings, wherein.

DETAILED DESCRIPTION OF THE INVENTION

Figure 1:
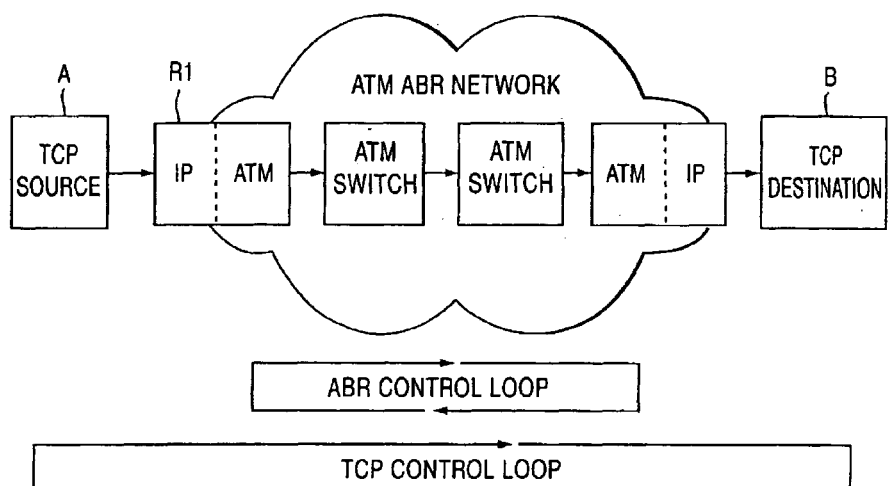
FIG. 1 illustrates a TCP connection path through an ABR-based ATM subnetwork.
Figure 2:
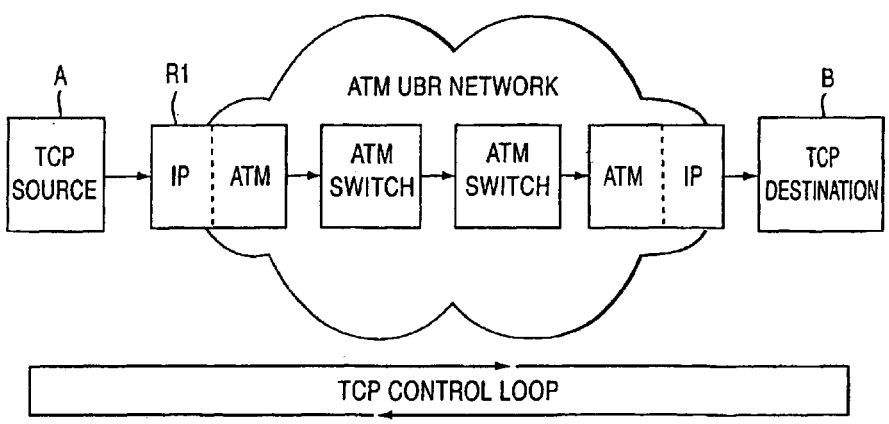
FIG. 2 illustrates a TCP connection path through a UBR-based ATM subnetwork.
Figure 3:
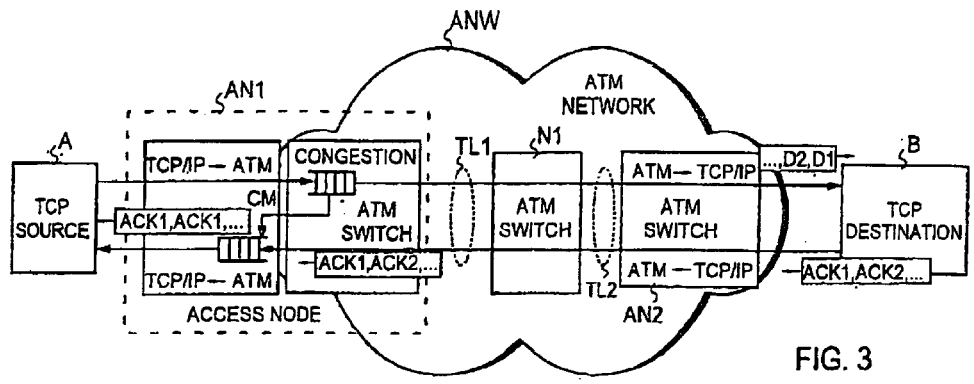
FIG. 3 illustrates the flow control loop according to the present invention in a TCP over ATM network.

FIG. 3 illustrates the basic principle of the invention by showing a connection between two user terminals (A and B) in a TCP over ATM network, i.e. the user terminals using TCP as a transport layer protocol, in addition to the access nodes (AN1 and AN2) of the user terminals, only one intermediate node (N1) and the transmission lines (TL1, TL2) connecting the nodes are shown.

The TCP connection between hosts A and B starts out the same as any other TCP connection, with a negotiation between the hosts to open the connection. This initial negotiation is called a three-way handshake, as three opening segments are transmitted during this handshake phase. The term "segment" refers to a unit of information passed by TCP to IP (Internet Protocol). IP headers are attached to these TCP segments to form IP datagrams, i.e. TCP segments are transferred to the receiver within IP datagrams, the information unit used by IP. During the initial handshaking process, the hosts inform each other of the maximum segment size they will accept, for example. This is done to avoid fragmentation of the TCP segments, as fragmentation would slow down the performance of the TCP connection considerably.

After the initial handshake has been completed, the hosts begin to send data by means of the TCP segments. Each uncorrupted TCP segment, including each handshaking segment, is acknowledged. To illustrate the basic idea of the invention, let us assume that host A sends TCP segments to host B. At the network layer, host A adds an IP header to each TCP segment to form IP datagrams. These datagrams are converted into standard ATM cells in an access node AN1 located at the edge of the ATM network ANW. The cells of the datagrams are then routed through the ATM network to the access node AN2 of host B. This access node reconstructs the original IP datagrams from the arriving cells and sends the reconstructed datagrams to host B. Host B removes the IP header to reveal the TCP segment from each datagram. If an individual segment is received correctly, host B sends an acknowledging TCP segment back to host A. In this way host B acknowledges each segment received correctly. Let us now assume that host A sends host B TCP segments D1, D2, and so on, and that host B acknowledges these segments by sending, respectively, acknowledgments ACK1, ACK2, and so on.

The load of the network is monitored in the access node AN1, for example, by monitoring the occupancy of one or more of the buffers buffering the traffic to the ATM network. If overload is detected (i.e. if buffer occupancy exceeds a predefined level), for example, after acknowledgment ACK1 has left node AN1 for host A, a congestion notification CM is sent inside the node to initiate the sending of duplicate acknowledgments towards the traffic sources. This transmission can be carried out, for example, by modifying the acknowledgments traveling at that moment through the switch towards the sources so that M successive acknowledgments become identical. Thus, the next acknowledgments (ACK2, ACK3 and so on) are modified when passing through access node AN1 so that M successive copies of acknowledgment ACK1; which was the last acknowledgment transmitted towards host A before excess load level was detected, are released from the node towards an individual traffic source. As mentioned earlier, modification implies that the acknowledgment numbers in the acknowledgments are converted so that the next M successive acknowledgments carry the same value as acknowledgment ACK1.

TCP is one of the few transport protocols with a built-in congestion control mechanism. The solution of the invention relies on this known TCP control mechanism, i.e. no other control mechanisms are needed in the source or in the destination. Therefore, this mechanism is described briefly in the following.

TCP congestion control is based on two variables: the receivers advertised window (Wrcvr) and the congestion window (CNWD). The receiver's advertised window is maintained at the receiver as a measure of the buffering capacity of the receiver, and the congestion window is maintained at the sender as a measure of the capacity of the network. The TCP source can never send more segments than the minimum of the receiver's advertised window and the congestion window.

The TCP congestion control method comprises two phases: slow start and congestion, avoidance. A variable called SSTHRES (slow start threshold) is maintained at the source to distinguish between the two phases. The source starts to transmit in the slow start phase by sending one TCP segment, i.e. the value of CWND Is set to one in the beginning. When the source receives an acknowledgment, it increments CWND by one, and, as a consequence, sends two more segments. In this way the value of CWND doubles every round trip time during the slow start phase, as each segment is acknowledged by the destination terminal. The slow start phase ends and the congestion avoidance phase begins when CWND reaches the value of SSTHRES.

If a packet is lost in a TCP connection, the source does not receive acknowledgment and so it times out. The source sets SSTHRES to half the CWND value when the packet was lost. More precisely, SSTHRES is set to max{2, min{CWND/2, Wrcvr}}, and CWND is set to one. As a result, the source enters the congestion avoidance phase. During the congestion avoidance phase, the source increments its CWND by 1/CWND every time a segment is acknowledged.

In the TCP, there is no way to tell the opposite end that a segment is missing or to acknowledge out-of-order data. If the destination receives an out-of-order segment, it immediately sends a duplicate acknowledgment. Since the opposite end does not know whether a duplicate acknowledgment is caused by a lost segment or just by the reordering of segments, it waits for a small number of duplicate acknowledgments, typically for three duplicate acknowledgments before reacting to the duplicate acknowledgments. Behind this is the assumption that if there is just a reordering of segments, there will be only one or two duplicate acknowledgments before the reordered segment is processed, which will then generate a new acknowledgment including an up-dated sequence number which shows that the missing segment has been received. However, if three or more duplicate acknowledgments are received in a row, it is a strong indication that a segment has been lost. The source then performs a retransmission of what appears to be the missing segment, without waiting for a retransmission timer to expire. This is called the fast retransmission algorithm. After this the source performs congestion avoidance, instead of slow start, in order not to reduce the data flow abruptly. This is called the fast recovery algorithm.

The present invention is based on the fast retransmission and fast recovery algorithms which the source automatically performs when receiving duplicate acknowledgments. These algorithms are nowadays widely implemented in different TCP versions. As the invention does not in any way change the above-described known TCP congestion control mechanism, the mechanism is not described in more detail here. Anyone interested in the matter can obtain more detailed information from several books describing the field. (For example, see W. Richard Stevens, TCP/IP Illustrated Volume 1, The protocols, Addison-Wesley, 1994, ISBN 0-201-63346-9)

According to the invention, when overload or congestion is detected at a network point, the source is sent M duplicate acknowledgments. In this way the TCP source, which operates in the manner described above, automatically starts to slow down its transmission rate. This is because according to the fast retransmission and fast recovery algorithms the source automatically reduces its output rate to one-half of the current rate.

Figure 4:
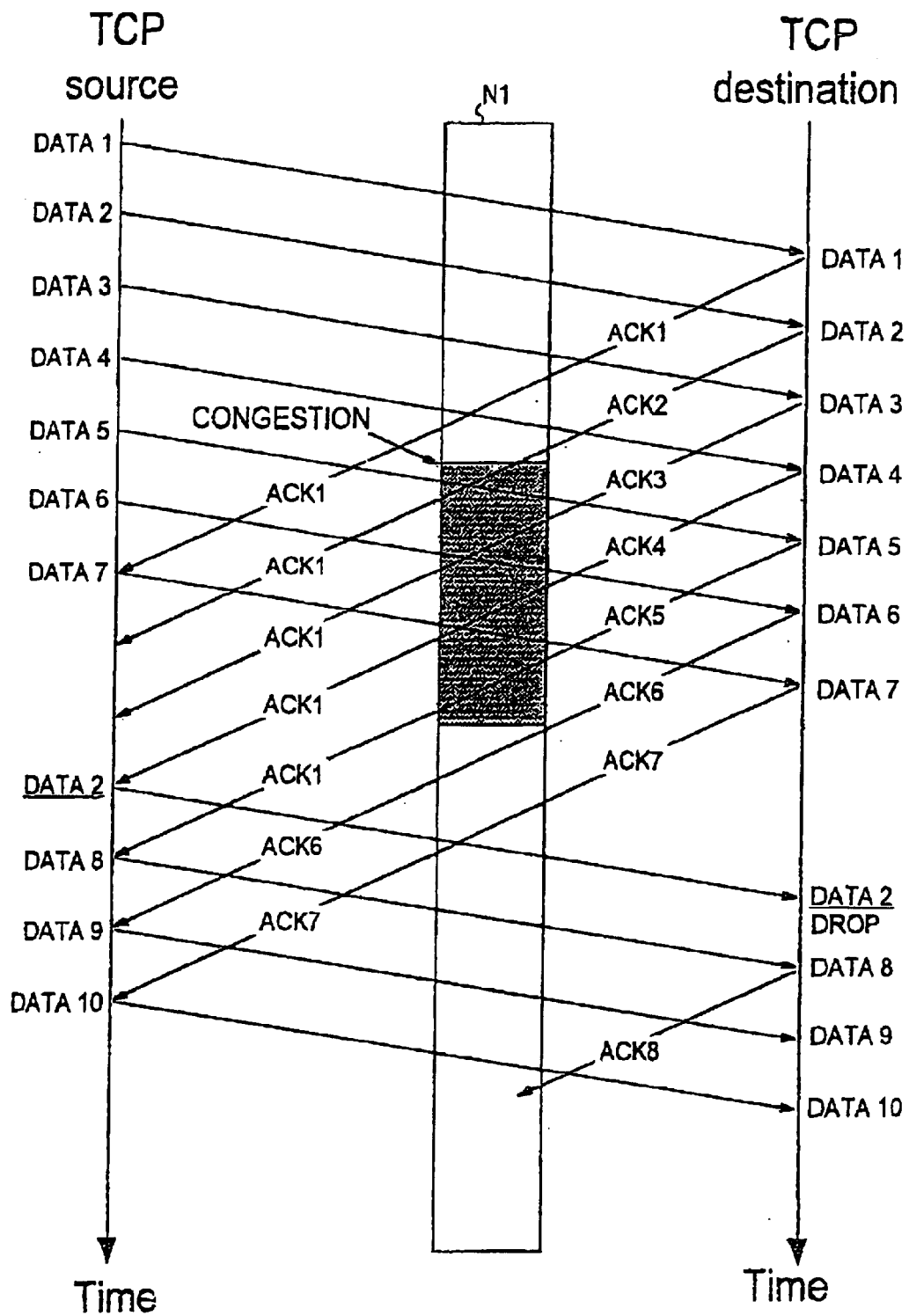
FIG. 4 illustrates data transfer between the traffic source and the traffic destination when duplicate acknowledgments are generated according to the first embodiment of the invention.

FIG. 4 is a time line illustrating the exchange of segments between a TCP source and a TCP destination. The source is shown on the left side and the destination on the right side. Node N1, which generates the duplicate acknowledgments, is shown between the source and the destination in this example, excessive load has not yet been detected when acknowledgment ACK1 leaves for the source from node N1. Therefore, acknowledgment ACK1 is immediately transmitted towards the source without its acknowledge ment number having been modified. After this, the network becomes congested. As a result, node N1 modifies the next acknowledgment (ACK2) traveling towards the source to generate a duplicate of acknowledgment ACK1, which is released without delay. If congestion continues, the node sends a number of duplicate acknowledgments (ACK1) towards the source. After receiving the third duplicate acknowledgment the source acts according to the fast retransmission and recovery algorithms, i.e. it retransmits DATA2 and sets SSTHRES to one half of the current congestion window. Also according to TCP, the destination drops the duplicate DATA2.

Figure 5:
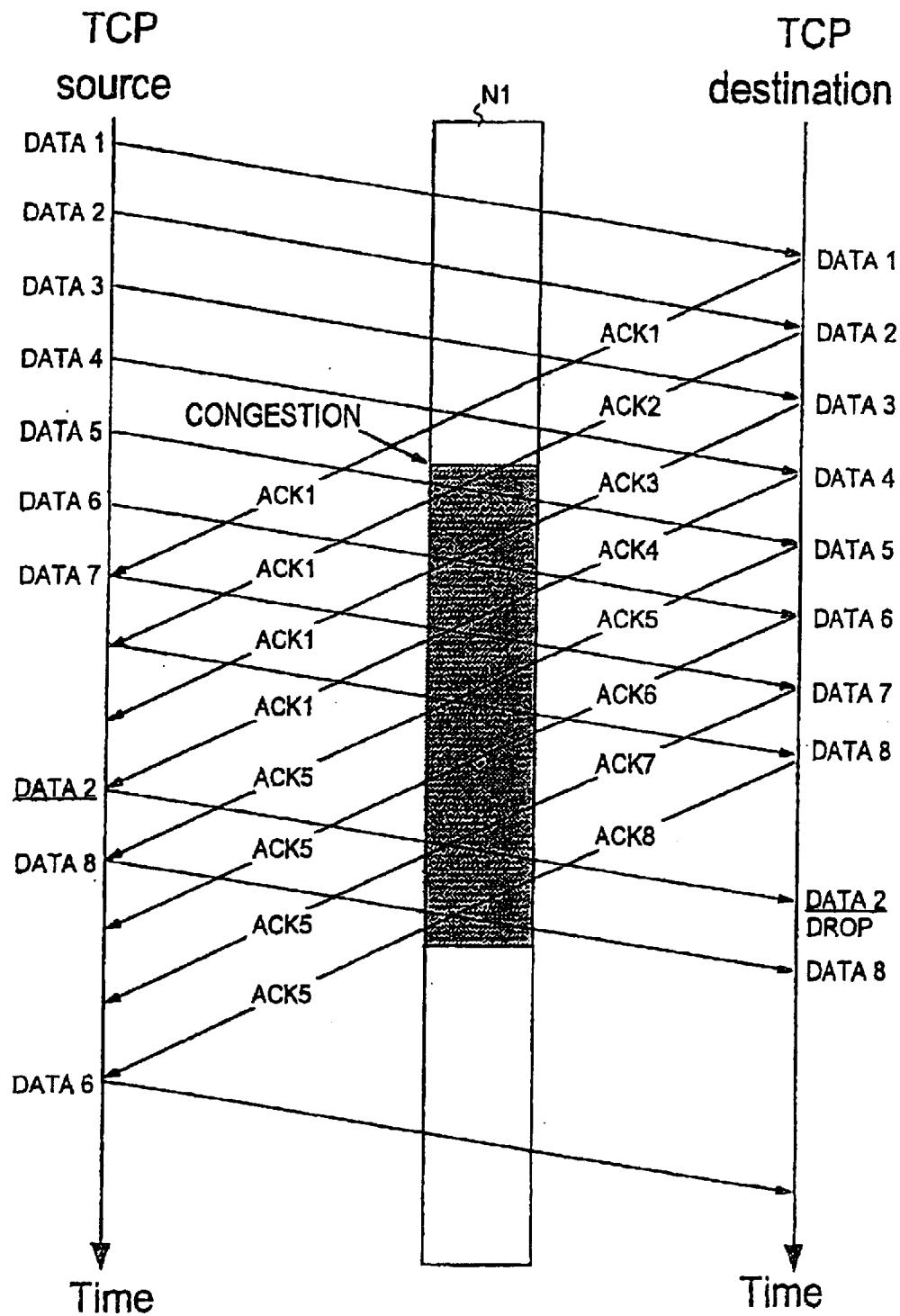
FIG. 5 illustrates data transfer between the traffic source and the traffic destination when duplicate acknowledgments are generated according to the second embodiment of the invention.

The number of duplicate acknowledgments generated at node N1 can vary. The node can, for example, convert all the incoming acknowledgments to duplicate acknowledgments as long as the congestion situation lasts. This kind of alternative is shown in FIG. 4. Alternatively, the node can generate a predetermined fixed number of duplicate acknowledgments, said number being equal to the number which causes the source to perform retransmission and reduction of the window size. FIG. 5 illustrates the latter alternative by showing an example in which three duplicate acknowledgments are generated in a row. Should the congestion situation continue, the node generates another three duplicate acknowledgments (as shown in the figure).

Figure 6:
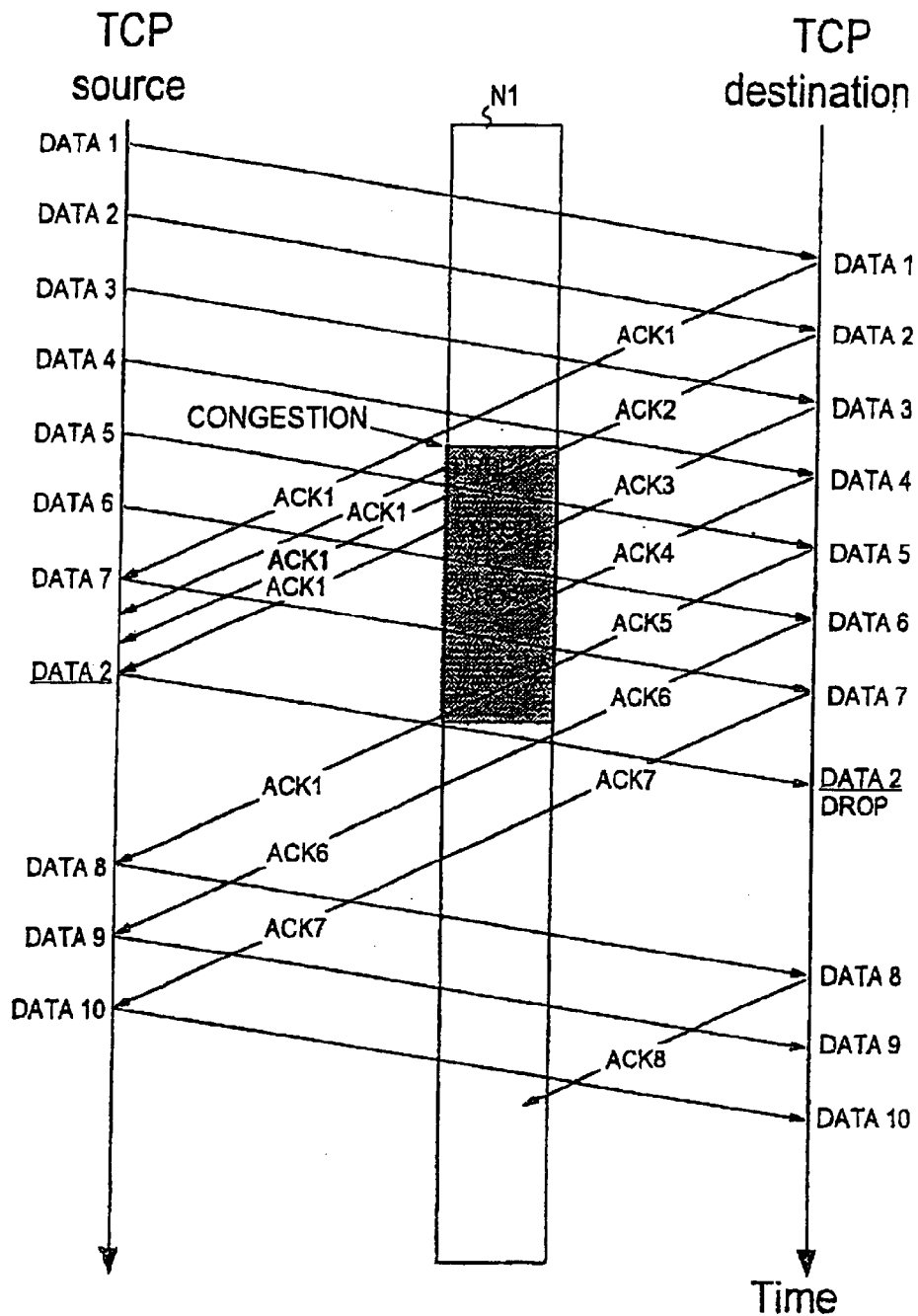
FIG. 6 illustrates data transfer between the traffic source and the traffic destination when duplicate acknowledgments are generated according to the third embodiment of the invention.

According to a further embodiment of the method, duplicate acknowledgments can be generated in the node without waiting for incoming acknowledgments to arrive for modification. FIG. 6 illustrates this kind of alternative in which node N1 sends three duplicate acknowledgments immediately after congestion has been detected. The next three incoming acknowledgments are then discarded in the node. The way in which the node generates the duplicate acknowledgments can also be a combination of the above-described schemes, for example, so that it depends on the increase rate of the load level; a rapid increase can initiate an instantaneous generation of duplicate acknowledgments (FIG. 6), whereas a slower increase can initiate modification of incoming acknowledgments.

Figure 7A:
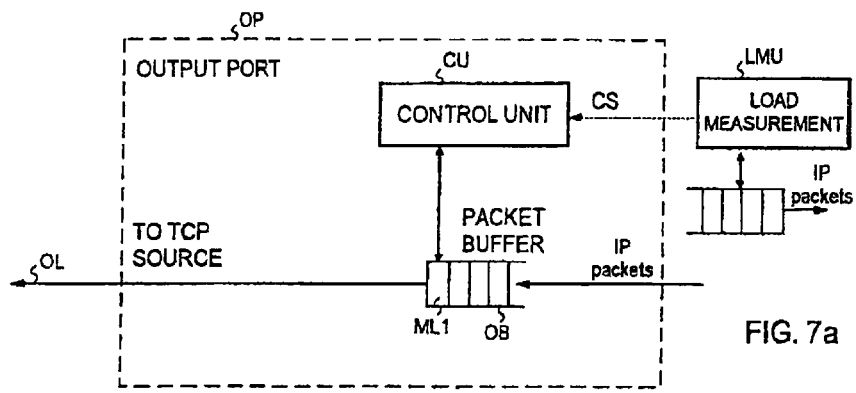
FIG. 7a illustrates one possible implementation of the new method in an IP switch.

FIG. 7a illustrates the generation of duplicate acknowledgments at the output port OP of an IP switch. A load measurement unit LMU determines the load level of the switch by measuring the fill rates (occupancies) of the buffers buffering the traffic passing through the switch in the forward direction. It is to be noted that the load level can be determined in any known manner.

The IP datagrams passing through the switch in the backward direction are first routed to their correct output port, where the datagrams received are stored in a FIFO-type output buffer OB.

If the congestion signal CS from the load measurement unit indicates that the load of the switch is below a predefined level, the control unit CU of the output port forwards all the datagrams (packets) directly to the outgoing link OL, irrespective of whether they include acknowledgments or not.

On the other hand, if the congestion signal CS indicates that the load level has reached a predefined level, the control unit starts to read the acknowledgment bit of each TCP header inside each IP datagram. If this bit is valid, i.e. if the datagram includes an acknowledgment, the control unit modifies the acknowledgment number of the packet to produce a duplicate acknowledgment. If the bit is not valid, the control unit forwards the packet directly to the outgoing link OL Thus, only packets including an acknowledgment are modified.

If shared buffer switch architecture is used, all the packets are buffered in a shared buffer prior to the routing of each packet to the correct output port $OP_1$ of the switch.

Figure 7B:
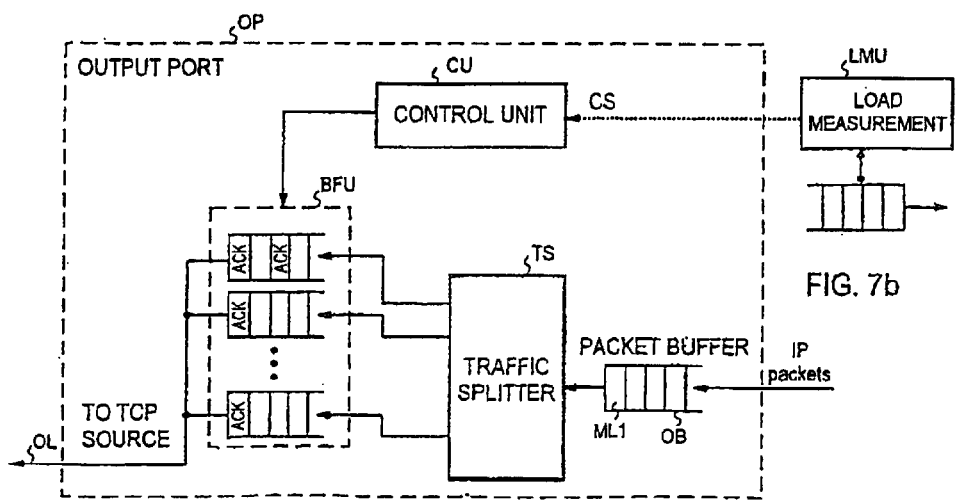
FIG. 7b illustrates an alternative way of generating duplicate acknowledgments.

In the embodiment of FIG. 7a, the packet buffer contains packets from several connections, and duplicated acknowledgments are generated in the same way at each connection. Alternatively, the packets may be stored on a per-connection basis at each output port, i.e. the data packets of each IP connection (or each TCP connection) can be stored in a separate buffer. Also the relative share of each connection in the forward buffer can be determined through measurement of the load level, and duplicated acknowledgments can be generated on the basis of the measured values. In other words, duplicated acknowledgments can be generated only on connections loading the network in excess of the others. FIG. 7b illustrates this alternative embodiment in which the output part has a buffer unit BFU, including separate queues for at least some of the connections. In this case a traffic splitter reads the stored packets out from the output buffer, one packet at a time from the first memory location ML1 of the buffer, directing each packet to a buffer corresponding to the connection in question.

As mentioned above, the congestion control method in accordance with the invention can be utilized in packet networks. This means that the network comprises user terminals, network access points providing access to the network, and switches. The user terminals act as traffic sources and destinations, i.e. as points transmitting and receiving data. The switches can be packet switches or ATM switches. An access point can be a router, for example, or an access point can carry out packet assembling/reassembling, routing, or switching, the duplication of acknowledgment packets is preferably carried out at the access points, but it can also be carried out in the switches within the network, as described later.

Figure 8A:
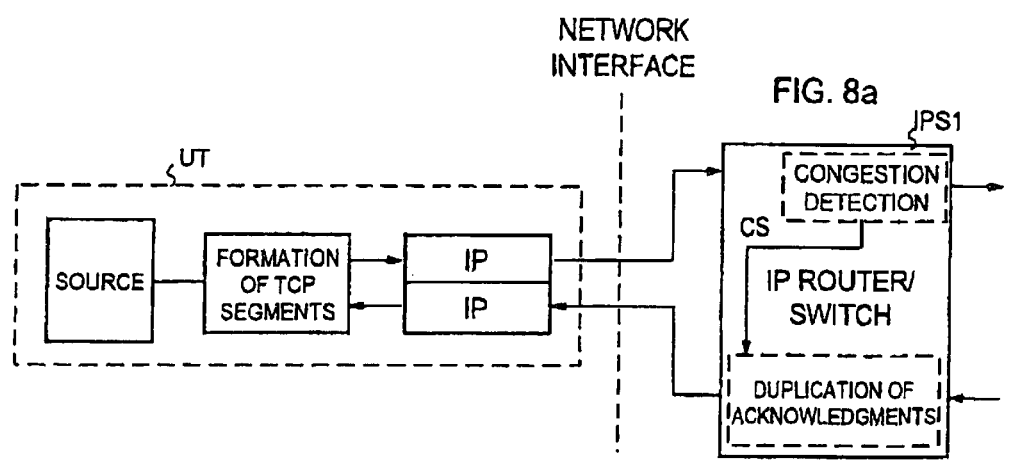
FIG. 8a illustrates one way of applying the method to an IP network.
Figure 8B:
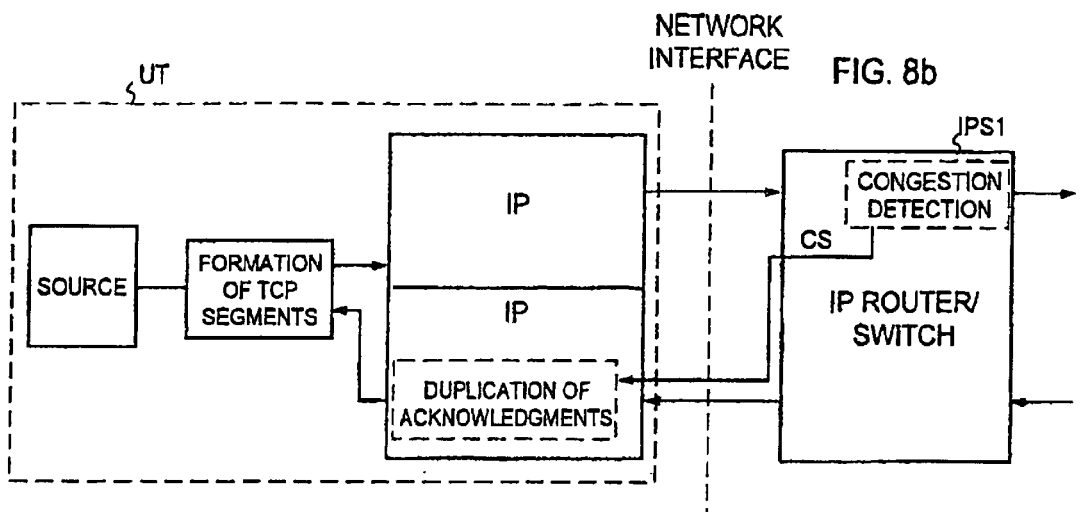
FIG. 8b illustrates another way of applying the method to an IP network.

FIGS. 8a and 8b show two different ways of implementing the invention in an IP network. In the embodiment of FIG. 8a, the congestion detection as well as the generation of duplicate acknowledgments are carried out within the access switch IPS1, which provides access to the IP network. In the embodiment of FIG. 8b, congestion detection is carried out in the access node, whereas the generation of duplicate acknowledgments is carried out in the TCP/IP protocol stack of the user terminal UT. Congestion notifications CS are transmitted to the user terminal, where duplicate acknowledgments are produced in one of the above-described manners prior to their being sent to the TCP source.

Figure 9A:
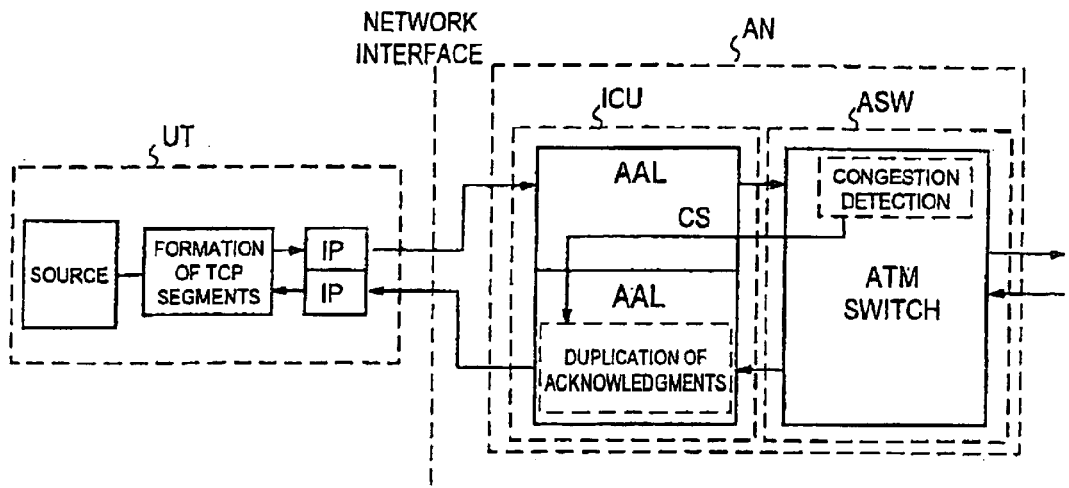
FIG. 9a illustrates one way of applying the method to an ATM network.
Figure 9B:
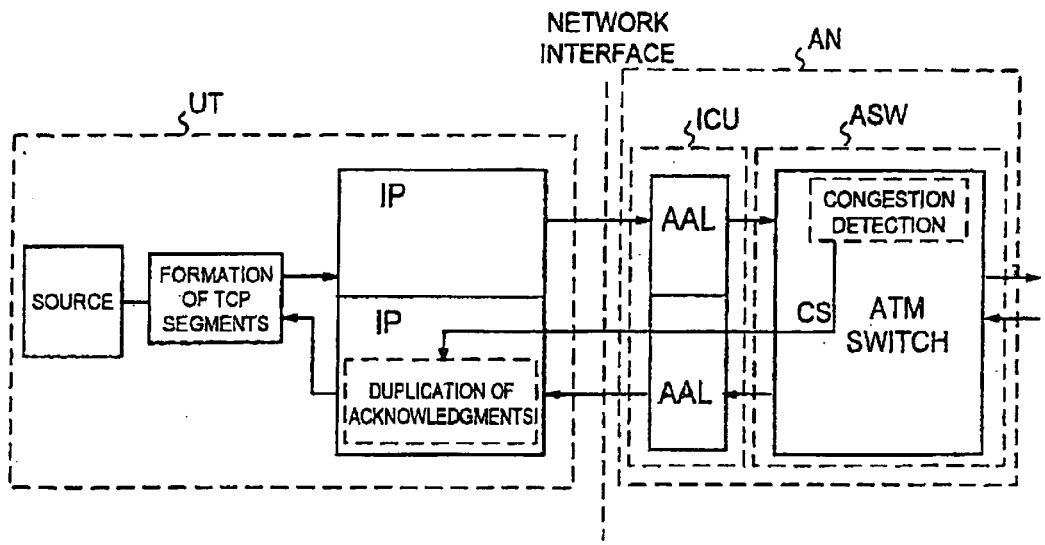
FIG. 9b illustrates another way of applying the method to an ATM network.

FIGS. 9a and 9b show two different ways of implementing the invention in association with an ATM network. In the embodiment of FIG. 9a, the congestion detection and the generation of duplicate acknowledgments are carried out in the access node AN. The access node can be divided into an interface card unit ICU and an ATM switch ASW. The interface card unit includes the ATM Adaptation Layer (AAL) functions for the segmentation and reassembly of the IP datagrams. Congestion is monitored in the ATM switch part of the node by monitoring, for example, the fill rates (occupancies) of the buffers buffering the subscriber traffic towards the network. Congestion notifications are transferred to the interface card unit, where the reassembled IP packets are modified (or new packets generated) in the above-described manner to form a desired number of successive duplicate acknowledgments. In the embodiment of FIG. 9b, congestion is monitored in switch ASW, whereas the duplicate acknowledgments are generated in the TCP/IP protocol-stack of the user terminal UT.

The embodiments of FIGS. 9a and 9a are more advantageous because it is much more economical to implement the processing of acknowledgments in a single access node rather than in several terminals located on user premises. Furthermore, it is naturally preferable that the user terminals need not be altered in any way to put the invention into use.

Figure 10:
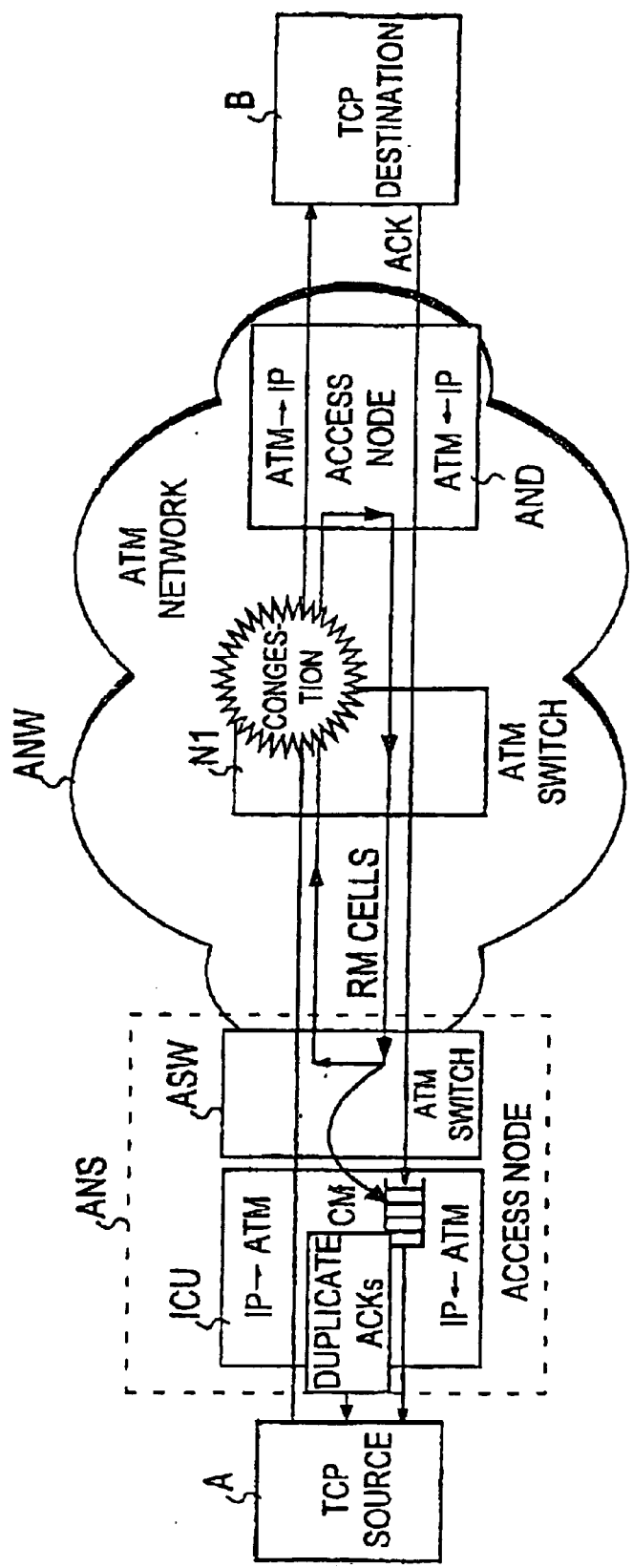
FIG. 10 illustrates the interworking of the TCP and ATM flow control loops according to one embodiment of the invention.

As mentioned earlier, one network element in the connection path can command another network element of the same path to start to generate duplicate acknowledgments. FIG. 10 illustrates this principle in a TCP over ATM network by showing a connection between two user terminals (A and B), using TCP as a transport layer protocol. In addition to the access nodes (ANS and AND) of the user terminals, only one intermediate ATM node (N1) and the transmission lines connecting the nodes are shown. It is assumed that the network nodes have channels in two directions; a forward channel and a backward channel. In order to simplify the description, we assume that the data packets are sent from terminal A to terminal B via access node ANS, one or more ATM switches, and access node AND (forward direction), while the acknowledgments are returned from terminal B to terminal A via access node AND, one or more ATM switches, and access node ANS (backward direction). As indicated above, the access nodes can be divided into an Interface card unit ICU and an ATM switch ASW. The interface card unit includes the ATM Adaptation Layer (AAL) functions for the segmentation and reassembly of the IP datagrams. As in the example of FIG. 9a, the generation of duplicate acknowledgments is performed in the interface card unit. However, in this case congestion is not monitored in the ATM switch part of the access node, but in an ATM switch located further within the ATM network. In FIG. 10, the said ATM switch, which commands the access node to start the duplication of acknowledgments, is switch N1.

In the network of FIG. 10, ABR flow control occurs between a sending end-system (ANS) and a receiving end-system (AND). As regards the RM cell flow in this bidirectional ABR connection, each termination point is both the sending and the receiving end-system. As shown in FIG. 10, for the forward information flow from access node ANS to access node AND, there is a control loop consisting of two RM cell flows, one in the forward direction and the other in the backward direction. Access node ANS generates forward RM cells, which are turned around by access node AND and sent back to access node ANS as backward RM cells. These backward RM cells carry feedback information provided by the network nodes and/or the access node AND. A network node within the ATM network, such as node N1, can:

insert feedback control information directly into RM cells when they pass the node in the forward or backward direction, indirectly inform tile source about congestion by setting the EFCI bit (Explicit Forward Congestion Indication) in the headers of data cells (i.e. user cells) traveling in the forward direction. In this case, the access node AND updates the backward RM cells according to this congestion information, generate backward RM cells.

Thus, there are at least three different ways of controlling the duplication of acknowledgments in the access node from within the network.

In RM cells, the congestion information can be inserted in the 45 octet long "Function Specific Fields", for example, or in the subsequent "Reserved" part having a length of 6 bits. The traffic parameters forwarded to the user of ABR capability via RM cells are described in item 5.5.6.3 of the ITU-T specification 1.371, and the structure of an RM cell is described in item 7.1 of said specification, where an interested reader can find a more detailed description of RM cells.

The EFCI bit, in turn, is the middlemost bit in the 3 bit wide PTI (Payload Type Indicator) field in the ATM cell header.

According to this embodiment of the invention, when overload or congestion is detected at an ATM network node, the corresponding access node receives backward RM cells containing the congestion information. On the basis of this information, the ATM switch part of the access node adjusts its output rate towards the ATM network, and the flow control mechanism duplicates the acknowledgments traveling towards the traffic source on the backward channel. In this way the TCP source automatically starts to slow down its transmission rate.

In the above-described way the end-to-end ABR flow control can be performed without changing the interworking TCP protocol. In other words, the interworking of the ATM and TCP flow control loops can be implemented in an inexpensive way.

The above-described method can also be used together with other flow control mechanisms. As the method has an efficient impact on the source, it may in some applications be advantageous to combine it with another method which takes care of slight congestion situations. According to a further embodiment of the invention, the duplication of acknowledgments is used together with a method which is otherwise similar to the above method but which delays the acknowledgments traveling towards the source, instead of duplicating acknowledgments. By delaying the acknowledgments the TCP source can be made to slow down its output rate, i.e. delaying has the same kind of effect on the TCP source as duplication.

Figure 11:
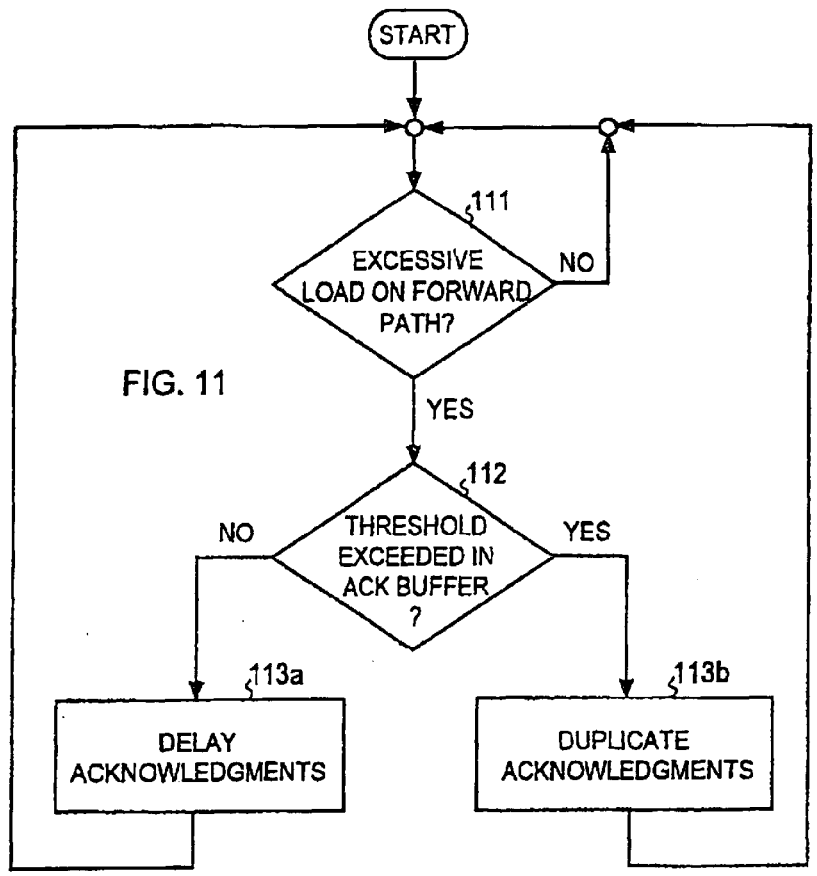
FIG. 11 is a flow diagram illustrating a further embodiment of the method.

FIG. 11 is a flow chart illustrating this combined method. If congestion is not detected along the forward path, the acknowledgments are forwarded without delay with the incoming acknowledgment number. If the load measurement detects that the load level on the forward path exceeds a predetermined value (phase 111), it is tested (phase 112) whether the fill rate of the acknowledgment buffer has exceeded a predetermined value. If this is the case, duplicate acknowledgments are generated. Otherwise acknowledgments are only delayed. Thus, if there is only slight congestion for a short period, delaying of acknowledgments is performed. However, should there be a more severe congestion situation, the system always moves over to generate duplicate acknowledgments.

Figure 12:
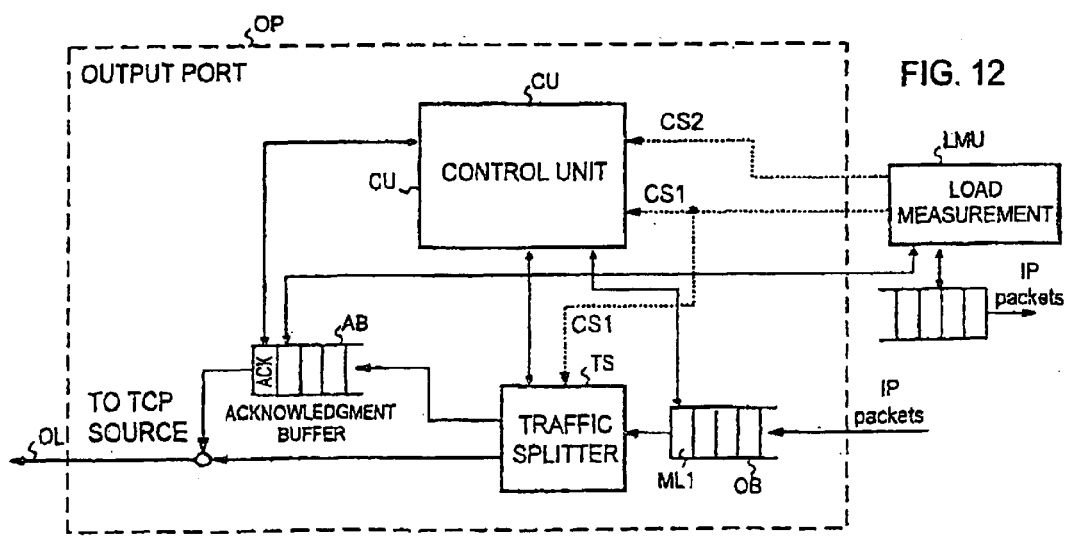
FIG. 12 illustrates one possible implementation of the method according to FIG. 11 in an IP switch.

FIG. 12 illustrates how this preferred embodiment is implemented in the node of FIG. 7a.

As mentioned above in connection with FIG. 7a, the IP datagrams passing through the switch in the backward direction are first routed to their correct output port. The datagrams received at this port are stored in a FIFO-type output buffer OB.

In this implementation, a traffic splitter TS has been added to the output of the packet buffer. The traffic splitter reads out the stored packets from the output buffer, one packet at a time from the first memory location ML1 of the buffer. The traffic splitter operates in the following ways.

If the congestion signal CS1 from the load measurement unit LMU indicates that the load of the switch on the forward path is below a predefined level, the traffic splitter forwards all the datagrams (packets) directly to the outgoing link OL, irrespective of whether they include acknowledgments or not.

On the other hand, if the congestion signal CS1 indicates that the load level has reached a predefined level, the traffic splitter starts to read the acknowledgment bit of each TCP header inside each IP datagram. If this bit has been validated, i.e. if the datagram includes an acknowledgment, the traffic splitter forwards the packet to an acknowledgment buffer AB. If the bit is not valid, the traffic splitter forwards the packet directly to the outgoing link OL. Thus, only packets including an acknowledgment are delayed.

In the acknowledgment buffer, each IP datagram is delayed for a certain period. The length of the period is preferably directly proportional to the current load level measured by the unit LMU. After the delay period for each outgoing acknowledgment packet has elapsed, the packet is sent to the outgoing link.

The load measurement unit LMU also measures the fill rate of the acknowledgment buffer AB. If this fill rate exceeds a predetermined value, the load measurement unit sends the control unit CU a second congestion signal CS2 indicating that the control unit should now begin to produce duplicate acknowledgments. As mentioned earlier, the duplication can be done by modifying the acknowledgment number of the acknowledgments in the packet buffer OB, for example. The traffic splitter is also instructed to direct all traffic directly to the output link. The command can be given either by the load measurement unit or by the control unit.

Although the invention has been described here in connection with the examples shown in the attached figures, it is clear that the invention is not limited to these examples, as it can be varied in several ways within the limits set by the attached patent claims. The following describes briefly some possible variations.

As indicated above, a prerequisite for a user terminal is that it acknowledges correctly received (i.e. uncorrupted) data units. Therefore, the idea can in principle be applied to any other protocol which sends acknowledgments and slows down its output rate if duplicate acknowledgments are sent to it. The measurement unit can provide information about the load level in many ways: as ON/OFF type information, or more than one bit can be used to indicate the value of the measured load. The signal informing about the load level can also include information on the particular connections that should be subject to duplication of acknowledgments. User terminals can also have wireless access to the network.

What is claimed is:

1. A method for controlling overload in a packet switched network comprising traffic sources, traffic destinations, and network nodes, the method comprising:

sending data units from a traffic source to a traffic destination along a forward path, sending acknowledgments from the traffic destination to the traffic source along a backward path, if data units are received correctly at the traffic destination, measuring load level both on the forward path and on the backward path, and transmitting duplicate acknowledgements towards the traffic source when a measured load level on the forward path is higher than a first predetermined value and a measured load level on the backward path is higher than a second predetermined value.

2. A method according to claim 1, comprising:

delaying acknowledgements when the measured load level on the forward path is higher than the first predetermined value and the measured load level on the backward path is lower than the second predetermined value.

3. A method according to claim 1, comprising:

generating the duplicate acknowledgements in the same network node than where load level is measured.

4. A method according to claim 1, comprising generating the duplicate acknowledgements in a different network node than where the load level is measured.

5. A method according to claim 4, wherein the duplicate acknowledgements are generated in an access node providing the traffic sources and destinations access to the network, and the load level is measured in at least one network node located within the network.

6. A method according to claim 5, wherein the network between the access nodes is an Asynchronous Transfer Mode network, the method comprising transporting load level information in resource management cells to said at least one access node.

7. A method according to claim 1, wherein duplicate acknowledgements age generated in a network node by modifying the contents of successive incoming acknowledgements before transmitting them towards the traffic source.

8. A method according to claim 7, wherein duplicate acknowledgements are transmitted towards the traffic source as long as the measured load level on the forward path remains higher than the first predetermined threshold.

9. A method according to claim 7, wherein at most a predetermined fixed number of successive duplicate acknowledgements are transmitted towards the traffic source during a period when the measured load level in the forward path remains higher than the first predetermined threshold.

10. A method according to claim 9, wherein after said predetermined fixed number of successive duplicate acknowledgements have been transmitted towards the traffic source, a new sequence of duplicate acknowledgements is started by generating duplicates of the next incoming acknowledgement.

11. A method according to claim 1, wherein at least part of said duplicate acknowledgements are generated by producing totally new acknowledgements which are copies of previously transmitted acknowledgements.

12. A method according to claim 11, wherein a fixed number of said new acknowledgements is transmitted towards the traffic source, the method comprising discarding a corresponding number of succeeding acknowledgements arriving at the node from the traffic destination.

13. A method according to claim 1, wherein duplicate acknowledgements are generated only on selected connections.

14. A packet switched telecommunications network comprising:

nodes interconnected by transmission lines, user terminals connected to said nodes, said user terminals acting as traffic sources when sending data packets and as traffic destinations when receiving data packets, measuring means for measuring current load level in a node, and duplicating means for generating duplicate acknowledgements and for sending said duplicated acknowledgements in the direction of the traffic source, wherein said duplicating means are configured to generate the duplicate acknowledgements when a measured load level on a forward path from a traffic source to a traffic destination is higher than a first predetermined value and a measured load level on a backward path from the traffic destination to the traffic source is higher than a second predetermined value.

15. A network according to claim 14, wherein at least one node comprises both the measuring means and the duplicating means.

16. A network according to claim 15, wherein at least one of said at least one network node is an access node connecting at least one user terminal to the network.

17. A network according to claim 15, wherein said network is configured to switch Internet Protocol data packets.

18. A network according to claim 14, wherein said network is an Asynchronous Transfer Mode network, and the duplicating means are connected to the measuring means by a resource management cell flow carrying information on the load level.

19. A node arrangement in a packet switched telecommunications network, the node arrangement comprising:

buffering means for buffering data packets traveling through the node, at least part of the data packets being acknowledgement packets, measuring means for measuring current load level in the node, and duplicating means, responsive to the measuring means, for generating duplicates of acknowledgement packets transferred through the node, wherein said duplicating means are configured to generate the duplicate acknowledgements when a measured load level on a forward path from a traffic source to a traffic destination is higher than a first predetermined value and a measured load level on a backward path from the traffic destination to the traffic source is higher than a second predetermined value.

* * * * *